March 4, 1952 — L. D. JAFFE — 2,587,622
METHOD AND APPARATUS FOR MEASURING HEAT
FLOW DURING QUENCHING OF METALS
Filed June 27, 1947
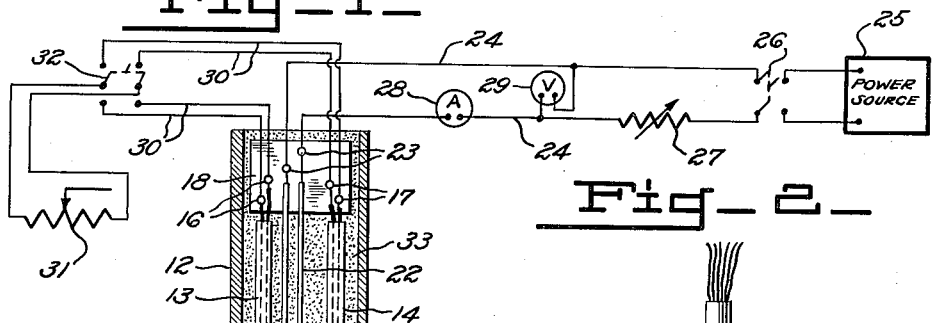
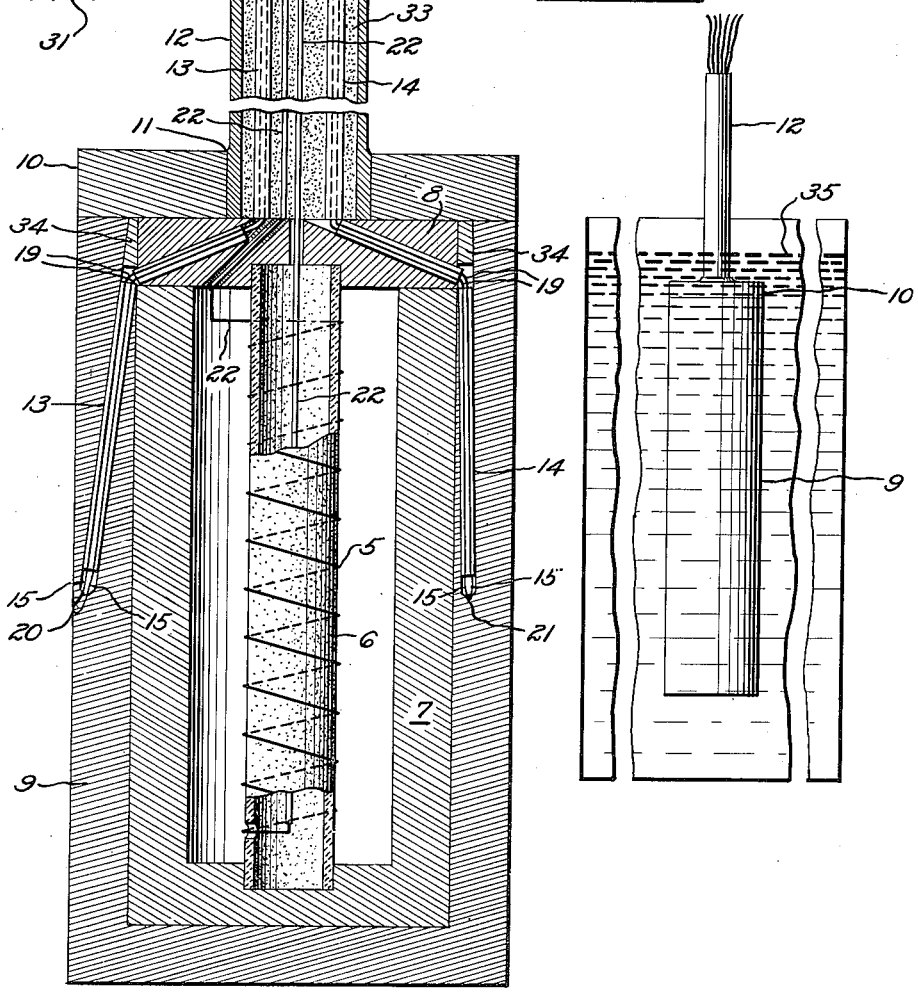
Inventor
Leonard D. Jaffe
By J. H. Church & W. E. Thibodeau
Attorneys Patented Mar. 4, 1952

2,587,622

UNITED STATES PATENT OFFICE 2,587,622

METHOD AND APPARATUS FOR MEASURING HEAT FLOW DURING QUENCHING OF METALS

Leonard D. Jaffe, Cambridge, Mass.

Application June 27, 1947, Serial No. 757,658

9 Claims. (Cl. 73—15)

(Granted under the act of March 3, 1883, as amended April 30, 1928; 370 O. G. 757)

The invention described herein may be manufactured and used by or for the Government for governmental purposes without the payment of any royalty thereon.

This invention relates to a method and apparatus for determining the heat flow characteristics which exist, during the quenching of metals, between the metal surface and the surrounding quenching medium.

Knowledge of the characteristics of heat flow from a hot metal surface to a surrounding quenching medium is of prime importance in the precise heat treatment of metals. Such information permits proper evaluation of the merits of different quenching media, media temperatures and velocities, as well as the optimum means of applying the media in question. It also permits accurate computation of the temperature-time relationship at any section within a metal part being quenched, as well as the temperature distribution throughout the part during the actual quenching thereof. As a result, the structures and properties that will be produced in the part by the quenching can be correctly predicted and, consequently, such knowledge can be utilized to prevent the likelihood of cracking, distortion, and other such remediable defects.

Previous methods of determining the heat flow across a quenched surface are essentially indirect and therefore lacking in precise accuracy. One such prior art method consists of quenching a part, sectioning it, and measuring the hardness across the resulting exposed sections to obtain certain inferences as to the heat flow characteristics. Another method is to measure the temperature at some point or points within or on the surface of the specimen undergoing quenching as a function of time. Such prior methods, however, at their best yield only some average value covering a wide range of temperatures. Furthermore, since the quenching characteristics of such media as water or oil are known to vary considerably as the temperature of the specimen surface changes during the quench, the results achieved by the above methods are consequently of limited worth.

Accordingly, it is an object of this invention to provide a novel method and apparatus which can be applied during the quenching of metals to determine the heat flow characteristics existing between the metal surface and the surrounding quenching medium.

It is a further object of this invention to provide a method and apparatus for obtaining measurements at the temperatures encountered during the actual quenching of metals in order to accurately evaluate the thermal conductivity across the quenched surface for use in the determination of the heat flow characteristics at that point.

The specific nature of the invention as well as other objects and advantages thereof will clearly appear from a description of the preferred embodiment as shown in the accompanying drawings in which:

Fig. 1 is a cross-sectional view showing the apparatus of this invention; and

Fig. 2 is a view showing the apparatus of Fig. 1 immersed in a conventional quenching tank.

The method and apparatus of this invention essentially utilizes the known principle that heat flow characteristics of a metal surface can be obtained from measurements of the temperature difference across the surface in conjunction with the measurements of the amount of heat flowing across such surface. Although the use of the method and apparatus of this invention is particularly adapted to the quenching of metals, it should be understood that heat flow characteristics of other materials of interest, such as ceramic, for example, may also be determined in the manner to be described.

To supply a known and constant influx of heat to the apparatus, there is here provided a resistor wire 5 preferably made of a heat-resisting metal such as a nickel-chromium alloy. As shown in Fig. 1, resistor wire 5 is helically wound about a hollow, cylindrical, core 6 of a suitable electrically non-conducting, refractory material such as aluminum oxide. Core 6 is contained within a cylindrical liner 7 and suitably secured at one end within the floor of liner 7. The other end of core 6 is suitably secured within a circular cap 8 which is fastened to the top of liner 7 in such manner that excellent thermal contact is provided therebetween. Unless the apparatus is to be used at extremely high temperatures, liner 7 and cap 8 are preferably composed of copper having a coating of silver electroplated on all exposed surfaces thereof to provide increased resistance to oxidation.

Liner 7 and cap 8 fit into a cylindrical sheath 9 in good thermal contact therewith. Sheath 9 is provided with a circular cover 10 which fits in good thermal contact therewith and in uniform thermal contact with cap 8. Both sheath 9 and cover 10 are fabricated from the metal whose heat flow characteristics are to be measured. Cover 10 is provided with a circular hole 11 and a pipe 12 is inserted therethrough and fastened in a suitable semi-permanent manner.

As shown in Fig. 1, a pair of thermocouples 13 and 14 comprising wires 15, extend into suitable holes drilled into sheath 9 and through cap 8 and pass through pipe 12 to terminate at respective pairs of binding posts 16 and 17 which are included in a terminal board 18 mounted within the top portion of pipe 12.

Refractory insulators 19 are provided about each wire 15 of thermocouples 13 and 14 to prevent electrical contact with one another and with sheath 9, cap 8, or pipe 12. However, at one end of thermocouples 13 and 14, wires 15 are exposed and permanently secured together, preferably by welding, thereby forming hot junctions 20 and 21 respectively, which are in good thermal contact with sheath 9. As illustrated in the drawing, junction 20 lies just inside the external surface of sheath 9 while junction 21 is located adjacent the internal surface of sheath 9.

The two ends of resistor wire 5 are connected to high-temperature leads 22 constructed of heat-resisting wire and insulated, where necessary, with suitable refractory insulators. Leads 22 extend through suitable holes in cap 8 and then through pipe 12 to terminate at a third pair of binding posts 23 on terminal board 18.

Connected to and extending from binding posts 23 are copper leads 24 utilized to introduce electric power into resistor wire 5 from a reasonably steady A. C. or D. C. source 25. An on-off switch 26 is provided to open or close the circuit as required. Included within the circuit is a variable resistor 27, an ammeter 28 and a voltmeter 29 for purposes to be shown.

Extension leads 30 are provided to connect bonding posts 16 and 17 with a potentiometer 31. A double-pole, double-throw switch 32 is provided in the circuit by means of which potentiometer 31 can be selectively connected to either of thermocouples 13 and 14.

Pipe 12 serves not only to protect thermocouples 13 and 14 and leads 22 but also as a handle for the apparatus itself. The space in pipe 12 between thermocouples 13, 14 and leads 22 is filled with asbestos wool 33 or such other similar material in order to reduce air convection therein, a factor which ordinarily results in appreciable heat loss. It is desired to point out that although the diameter of pipe 12 is somewhat exaggerated in the drawing for the sake of clarity, the actual diameter is preferably much smaller than that of core 6. Plugs 34 of the same material as sheath 9 are provided to fill the unused portions of the holes drilled in sheath 9 for the passage of thermocouples 13 and 14.

The method by which the desired heat flow characteristics are determined consists essentially of the following procedure. The apparatus is first placed in a suitable quenching medium 35 and then such medium is brought to the desired temperature and is circulated and agitated in any manner conventional in the art. Switch 26 is then closed and variable resistor 27 is adjusted to some convenient value. The E. M. F. from thermocouple 13 is read on potentiometer 31 at intervals. When this E. M. F. has attained a constant value, switch 32 is reversed and the E. M. F. of the other thermocouple 14 is read on potentiometer 31. A reading of the current and voltage input to resistor wire 5 is obtained at this time from ammeter 28 and voltmeter 29 respectively. The temperature of the quenching medium is then determined at a point unaffected by the heat produced in the apparatus. From the foregoing information, the desired heat flow characteristics can readily be computed.

To determine the heat flow characteristics for another surface temperature, the variable resistor 27 is adjusted to another value and the above procedure repeated. This can be done as often as is necessary to determine the heat flow characteristics for all surface temperatures of interest.

The thermocouple E. M. F. readings indicate the temperatures at junction points 20 and 21. The product of the current and voltage readings is the power dissipated as heat at resistor wire 5. When the temperature at junction point 20 is constant, this power is equal to the rate of heat flow out through liner 7 and its cap 8 then through sheath 9 and its cover 10 to quenching medium 35. From the known dimensions of the parts, the rate of heat flow per unit area can be readily computed. If so desired, corrections can be made for the power dissipated in leads 24 and for the heat loss along pipe 12.

The surface temperature of sheath 9 can be readily determined from the actual temperature measured at junction point 20 because the temperature gradient between the inner and outer surfaces of sheath 9 is roughly linear when the temperatures are not changing. Therefore, the temperature measurements at junction 20 can be used as a basis of an extrapolation to give the temperature of the outer surface of sheath 9. Of course, the closer junction 20 is located to the outer surface of sheath 9, the smaller the error as a result of the extrapolation. The difference between the surface temperature and that of medium 35 taken at a distance from the apparatus is the temperature difference across the interface. The term "interface" is here considered to consist not only of the surface between metal sheath 9 and medium 35, but also that portion of the adjacent medium which is significantly raised in temperature by the heat coming from the apparatus. It is assumed, of course, that the bulk of the medium 35 is not appreciably heated by the specimen under test. This assumption is ordinarily valid for commercial quenching equipment where the volume of the medium is large, proper circulation and agitation are provided, and the medium is maintained at a constant temperature. The heat flow characteristics of the interface, such as the film coefficient and the quenching severity, are readily computed from the temperature difference across the interface and the rate of heat flow per unit area of external sheath surface.

For computation of some of the heat flow characteristics, a knowledge of the thermal conductivity of the sheath metal at the surface temperature is desirable. This thermal conductivity may be obtained by the use of the measured temperature at junction point 21. The distances of junction points 20 and 21 from the external surface of the sheath 9 are known, and therefore the difference between these distances can be computed. The difference in temperature of the two junction points divided by the difference in distance is the thermal gradient through sheath 9. The rate of heat flow per unit area divided by the thermal gradient is the thermal conductivity. It is obvious that the conductivity measured in this way is averaged over the temperature interval between point 20 and point 21 and is not that at point 21 itself. Since point 21 is not far from the inner surface of sheath 9 and the temperature at point 21 does not vary greatly from the temperature at that surface, the error involved in using the thermal conductivity measured in the manner outlined above is generally negligible. However, correction for such minor error can be made if desired.

While the preferred embodiment is shown as having two thermocouples 13 and 14, the object of this invention may also be achieved with but one thermocouple. However, in such case, the thermal conductivity must be determined separately by some conventional method.

It is also to be understood that the thickness of sheath 9 and cover 10 may vary. Although shown in Fig. 1 to be of sufficient thickness to contain thermocouples 13 and 14, the use of thin sheet material is equally applicable. In such event, thermocouple 13 is located so that the hot junction 20 thereof is placed in good thermal contact with the internal surface of the thin sheath. Here again, thermocouple 14 may be eliminated and the thermal conductivity determined beforehand or separately.

It should be noted that when using the apparatus with a liquid medium, it may be desirable to gasket all the joints to prevent the liquid from leaking in. If gaskets are not employed it is generally advisable to close switch 26 and permit the apparatus to heat above the boiling temperature of the medium before the apparatus is placed therein. Measurements in this case should be limited to surface temperatures above the boiling temperature of the medium. A liquid medium ordinarily will not leak through joints which are hotter than its boiling temperature.

In some cases the thermal characteristics of the metal being tested may vary with time. Such change, of course, limits the applicability of the method of this invention, as well as any other method known in the art. However, if such changes are not too rapid, the method previously described is entirely applicable. For instance, it may be desired to study the characteristics of austenite in steel at a temperature at which the austenite is unstable. By providing sufficient power to the apparatus, the steel may be heated to the particular temperature at which it becomes austentic. The power may then be decreased so that the steel cools to the temperature of interest and the necessary readings taken before appreciable decomposition of the austenite takes place.

Thus there is here provided a reliable and effective method and apparatus for determining the heat flow characteristics which exist, during the quenching of metals, between the metal surface and the surrounding quenching medium. Such a method and apparatus is operable during the actual quenching of the metal and accordingly the required heat flow characteristics can be derived with a far higher degree of accuracy than is possible with the indirect methods heretofore found in the art.

I claim:

1. The method of determining the heat flow characteristics of the interface between a material and a surrounding medium, comprising the steps of, immersing a body formed of the material into the medium, applying heat at a known and constant temperature to the external surface of the body, and measuring the temperature difference between the external surface of the body and a point in the medium not affected by the heat flow to compute the rate of heat dissipated through the interface.

2. The method of determining the heat flow characteristics of the interface between a material and a surrounding medium, comprising the steps of, immersing a body formed of the material into the medium, introducing an electric current through resistance elements in the body to produce heat therein, measuring the temperature at which the heat is supplied to the external surface of the body until a constant value is attained, and then measuring the temperature difference between the external surface of the body and a point in the quenching medium not affected by the heat flow to compute the rate of heat flow across the interface.

3. The method of determining the heat flow characteristics of the interface between a material and a surrounding medium, comprising the steps of, immersing a body formed of the material into the medium, supplying heat to the external surface of the body at a series of different known and constant temperatures, and at each of the temperatures measuring the temperature difference between the external surface of the body and a point in the medium not affected by the heat flow to compute the rate of heat dissipated through the interface.

4. In an apparatus for determining the heat flow characteristics of the interface between a metal and a quenching medium, a body composed of the metal to be quenched, handle means for inserting said body in the quenching medium, a non-conducting refractory core in said body, a resistor wire wound about said core, means for passing an electric current through said resistor wire to provide a known and constant heat flow into said body, and thermocouple means located within said body for measuring the temperature at the external surface of said body.

5. In an apparatus for determining the heat flow characteristics of the interface between a metal and a quenching medium, a hollow body composed of the metal to be quenched, handle means for inserting said body in the quenching medium, a non-conducting refractory core disposed within said body, a resistor wire wound about said core, a source of current connected to said resistor wire, a variable resistor for varying the amount of current introduced to said resistor wire, means for measuring the varying current and voltage input to said resistor wire, a plurality of thermocouples embedded in said body, and potentiometer means for measuring the temperature indicated by said thermocouples.

6. In an apparatus for determining the heat flow characteristics of the interface between a metal and a quenching medium, a body composed of the metal to be quenched and having a hollow interior portion, a liner and cap in said hollow interior portion in thermal contact therewith, said liner and cap fabricated from a thermally conducting material having a plating on the exposed surfaces thereof to resist oxidation, a hollow handle portion having one end secured to said body portion in thermal conductivity therewith, a non-conducting refractory core disposed within said hollow interior portion of said body and connected at one end thereto, a resistor wire wound about said core, said wire having leads extending therefrom and passing through said body and said handle portion, a pair of insulated thermocouple leads embedded in said body and extending through said handle portion, one of said thermocouples having an exposed junction adjacent the outer surface of said body, the second of said thermocouples having an exposed junction adjacent the interior surface of said body, a terminal board disposed within the open end of said handle portion, said terminal board having binding posts for receiving the leads of said resistor wire and said thermocouples, insulating material arranged in said handle portion to separate said resistor wire leads and said thermocouples from one another and from the walls of said handle portion, means for passing an electric current through said resistor wire to provide a known and constant heat flow into said body, and potentiometer means for measuring the temperatures of said body at the points having the junctions of said thermocouple leads.

7. The method of determining the heat flow characteristics of the interface between a metal and a surrounding quenching medium, comprising the steps of, immersing a body formed of the metal into the quenching medium, applying heat at a known and constant temperature to the external surface of the body, measuring the temperature difference between the internal and the external surface of the body to determine the thermal conductivity of the metal, and measuring the temperature difference between the external surface of the body and a point in the quenching medium not affected by the heat flow to compute the rate of heat flow across the interface.

8. The method of determining the heat flow characteristics of the interface between a metal and a surrounding quenching medium, comprising the steps of, immersing a body formed of the metal into the quenching medium, supplying heat to the external surface of the body at a series of known and constant temperatures, measuring the change in temperature between the external surface and the internal surface of the body to determine the thermal conductivity of the metal, and measuring the change in temperature between the external surface of the body and a point in the quenching medium not affected by the heat flow to compute the rate of heat dissipated through the interface.

9. In an apparatus for determining the heat flow characteristics of the interface between a metal and a surrounding quenching medium, a body composed of the metal to be quenched, handle means for inserting said body in the quenching medium whereby the entire external surface thereof is surrounded by the quenching medium, means for supplying heat to said body at a known and constant rate so that the external surface temperature is substantially the same throughout, first thermocouple means located adjacent the external surface of said body, and second thermocouple means located near the internal surface of said body, said first and second thermocouple means being thereby arranged to determine the thermal conductivity of said body during the quenching thereof for computation of the rate of heat flow across the interface.

LEONARD D. JAFFE.

REFERENCES CITED

The following references are of record in the file of this patent:

UNITED STATES PATENTS

| Number | Name | Date |
|---|---|---|
| 2,329,813 | Amsler | Sept. 21, 1943 |

FOREIGN PATENTS

| Number | Country | Date |
|---|---|---|
| 442,294 | Germany | Mar. 24, 1927 |
| 575,373 | Germany | Apr. 27, 1933 |

OTHER REFERENCES

Elements of Physics—Smith, McGraw-Hill Book Co. 1938, pgs. 306–307.